No. 864,406. PATENTED AUG. 27, 1907.
F. BUCHHOP & H. NIEMANN.
FOCUSING HOOD FOR CAMERAS.
APPLICATION FILED JUNE 28, 1906.
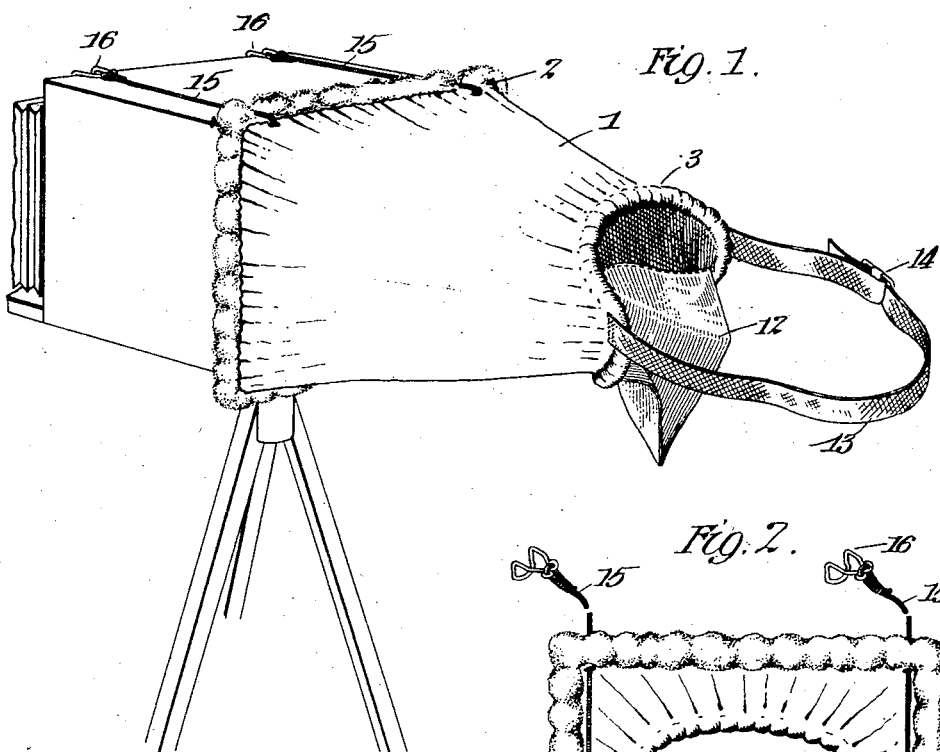
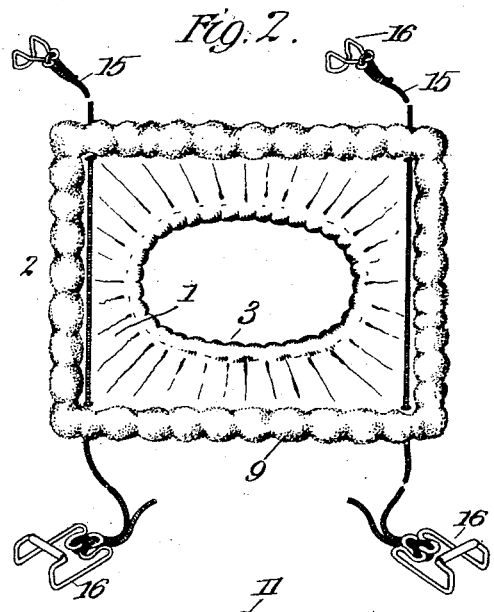
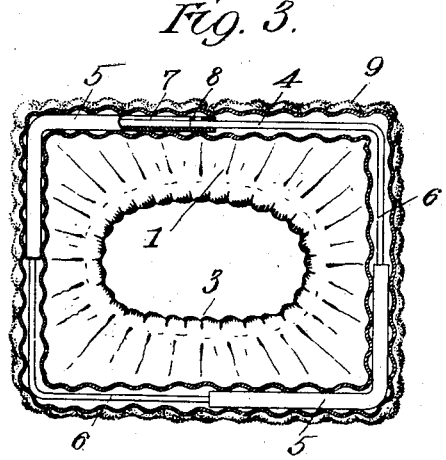
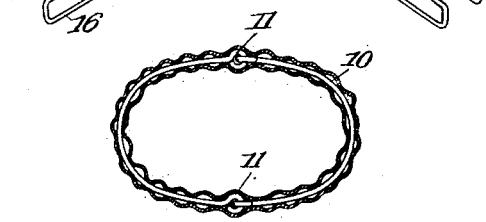
Witnesses
Inventors
Ferdinand Buchhop
Henry Niemann
By their Attorneys

UNITED STATES PATENT OFFICE.

FERDINAND BUCHHOP AND HENRY NIEMANN, OF NEW YORK, N. Y.

FOCUSING-HOOD FOR CAMERAS.

No. 864,406.　　　　Specification of Letters Patent.　　　　Patented Aug. 27, 1907.

Application filed June 28, 1906. Serial No. 323,886.

*To all whom it may concern:*

Be it known that we, FERDINAND BUCHHOP and HENRY NIEMANN, citizens of the United States, residing at the city of New York, in the county of Kings, borough of Brooklyn, and State of New York, have invented certain new and useful Improvements in Focusing-Hoods for Cameras, of which the following is a full, clear, and exact description.

Our invention relates to a form of focusing hood or screen for use with cameras, and which is designed to provide a darkened space in which the operator may observe the image on a ground glass plate.

The principal object of the invention is to provide a device of this character which shall absolutely exclude the light when in use, and which may be folded into a compact compass when desired.

A further object of the invention is to provide a focusing hood or screen which is adjustable to suit any size of camera within certain limits.

A still further object of the invention is to provide a focusing hood of ornamental appearance, and which is cheap to manufacture, and durable in use.

With these and other objects in view, the invention consists in the construction, combination, in the location and in the arrangement of parts, as hereinafter set forth and shown, and finally particularly pointed out in the appended claims.

In the drawings: Figure 1 is a perspective view showing a focusing hood embodying the principles of our invention applied to a camera; Fig. 2 is a view looking into the hood; Fig. 3 is a similar view showing some of the parts in section; Fig. 4 is a detail sectional view of the hood at the portion which fits against the face of the wearer.

In order to know what sort of a picture can be obtained under any circumstances, it is customary to initially "compose" the picture on a plate of ground glass which is inserted into the camera in place of the usual plate frame. The image of the object is, however, not distinct unless the light is cut off from the rear of the plate, and from the eyes of the observer. Accordingly the photographer is usually equipped with a hood or screen for cutting off the light in this way, or as great a portion of it as possible. When a black cloth is used, it is evident that more or less light enters, particularly from below, so that perfect results cannot be attained. Moreover the manipulation with a black cloth is difficult and annoying, particularly in windy places.

In carrying out our invention we aim to overcome all of these defects, and to provide a focusing hood which can be carried in a compact compass, which can be adjusted to any camera, and which wholly excludes extraneous light in use.

Referring now to the drawings in which like parts are designated by the same reference sign, 1 indicates the main body or fabric of a focusing hood, which is conveniently of black cloth impermeable to light. This hood may be plaited if desired, but we prefer to make it of simple tubular form, gathered at its edges 2 and 3, so as to fit upon a pair of frame members respectively designed to make close connection with the camera and with the face of the photographer.

The front frame 4 is particularly illustrated in Fig. 3, and is generally rectangular in outline and extensible in all directions. We provide a convenient practical construction for securing this extensibility, and which has angle tubes and angle rods. The angle tubes are shown at 5 and the angle rods at 6, the latter telescoping into the former so as to provide a frame which may be adjusted to any dimensions within certain limits, but which always presents a rectangular outline under all circumstances. If desired, the angle plates may be slotted, as shown at 7, and the rods may have a stud 8 thereon working in said slot so as to limit the expansion of the frame. The edge 2 of the cloth 1 is folded around this entire frame and sewed in such relation so as to wholly inclose the same. When the frame is contracted, the cloth gathers into folds or plaits to accord itself to the new dimensions. In practice we fasten a strip of fluffy fabric 9, upon the edge 2, so as to make a more perfectly light-tight joint when the frame is contracted around a camera obscura. The edge 3 of the focusing hood is similarly folded around a frame 10, conveniently made of two wire hooks or bails, flexibly joined together at the points 11. The form of these wire bails may be curved in any way so as to fit most conveniently against the face of the average person.

12 indicates a mask which is secured to the hood so as to fit around the nose of the photographer and exclude the light as far as possible.

13 indicates a band which may be of elastic material, and has a fastening device 14. This band is designed to encircle the head of the wearer and hold the focusing hood in its proper place. As an additional fastening means we provide elastic cords 15, in practice, which extend through the hood near the edge 2, and have hooks 16 thereon, by which the device is attached to a camera. It is evident that other forms of fastening means may be employed.

The operation of our focusing hood will be apparent from the preceding description. It is merely necessary to contract the frame 4 over the ground glass holder of any camera, and then encircle the band 13 around the head, and make the necessary observations through the focusing hood. When the adjustments are satisfactory the hood is quickly removable, and may be collapsed and folded up into a compact compass.

While it is intended that our improved focusing hood shall be attachable to and removable from a camera, it is obvious that the same may be permanently connected to the camera, without departing from the spirit of the invention.

What we claim, is:—

1. A focusing hood, comprising a body of flexible material and an expansible and contractible frame at one end of said body adapted to be secured to the frame of the camera, said frame having means by which a rectangular outline is preserved under all circumstances.

2. A focusing hood, comprising a tubular body of flexible opaque material, an expansible and contractible frame at one end thereof, and means on said body for securing the same to the frame of a camera, said frame having means by which a rectangular outline is preserved under all circumstances.

3. A focusing hood, comprising a body of flexible material having an expansible and contractible frame at one end having means by which a rectangular outline is preserved under all circumstances, and a frame at the other end adapted to conform to the features of the face.

4. A focusing hood, comprising a body of flexible material, an expansible and contractible frame at one end thereof around which the material of the body is folded said frame having means by which a rectangular outline is preserved under all circumstances, and means whereby the opposite end of the body is conformed to the face of the operator.

5. A focusing hood, comprising a body of flexible material having an expansible and contractible frame at one end said frame having means by which a rectangular outline is preserved under all circumstances, means at such end for insuring a light-tight connection with a camera, and means at the other end of the body, whereby it is conformed to the face of the operator.

6. A focusing hood, comprising a body of flexible material, an expansible and contractible frame at one end thereof around which the material of the body is folded and sewed said frame having means by which a rectangular outline is preserved under all circumstances, a strip of fluffy material on said end to make a light-tight joint with the camera, and means at the other end of the body to conform such end to the face of the operator.

7. A focusing hood, comprising a body of flexible material, a rectangular frame having angle tubes and angle bars telescoping together and secured to one end of the body, and means for limiting the expansion of such frame.

8. A focusing hood, comprising a body of flexible material, a rectangular expansible and contractible frame having angle tubes and angle bars telescoping into one another, and an additional frame on said body adapted to conform to the face of the operator.

9. A focusing hood, comprising a body of flexible material, an expansible and contractible rectangular frame at one end thereof, and a frame at the other end including two loops jointed to one another and secured to the body whereby the latter is conformed to the face of the operator.

In witness whereof, we subscribe our signatures, in the presence of two witnesses.

FERDINAND BUCHHOP.
HENRY NIEMANN.

Witnesses:
EDWIN D. WILLARD,
FRANK H. CZIESLIK.